Nov. 8, 1938.                     H. J. LENTZ                      2,136,013
INSERT FOR CONVERTING PISTON VALVE ENGINES INTO POPPET VALVE ENGINES
                    Filed April 7, 1937        6 Sheets-Sheet 1

Inventor:
Hugo Johannes Lentz
by Bryant & Savoy
his attorneys.

Nov. 8, 1938.   H. J. LENTZ   2,136,013
INSERT FOR CONVERTING PISTON VALVE ENGINES INTO POPPET VALVE ENGINES
Filed April 7, 1937   6 Sheets-Sheet 2

Nov. 8, 1938.  H. J. LENTZ  2,136,013
INSERT FOR CONVERTING PISTON VALVE ENGINES INTO POPPET VALVE ENGINES
Filed April 7, 1937  6 Sheets-Sheet 3

Inventor:

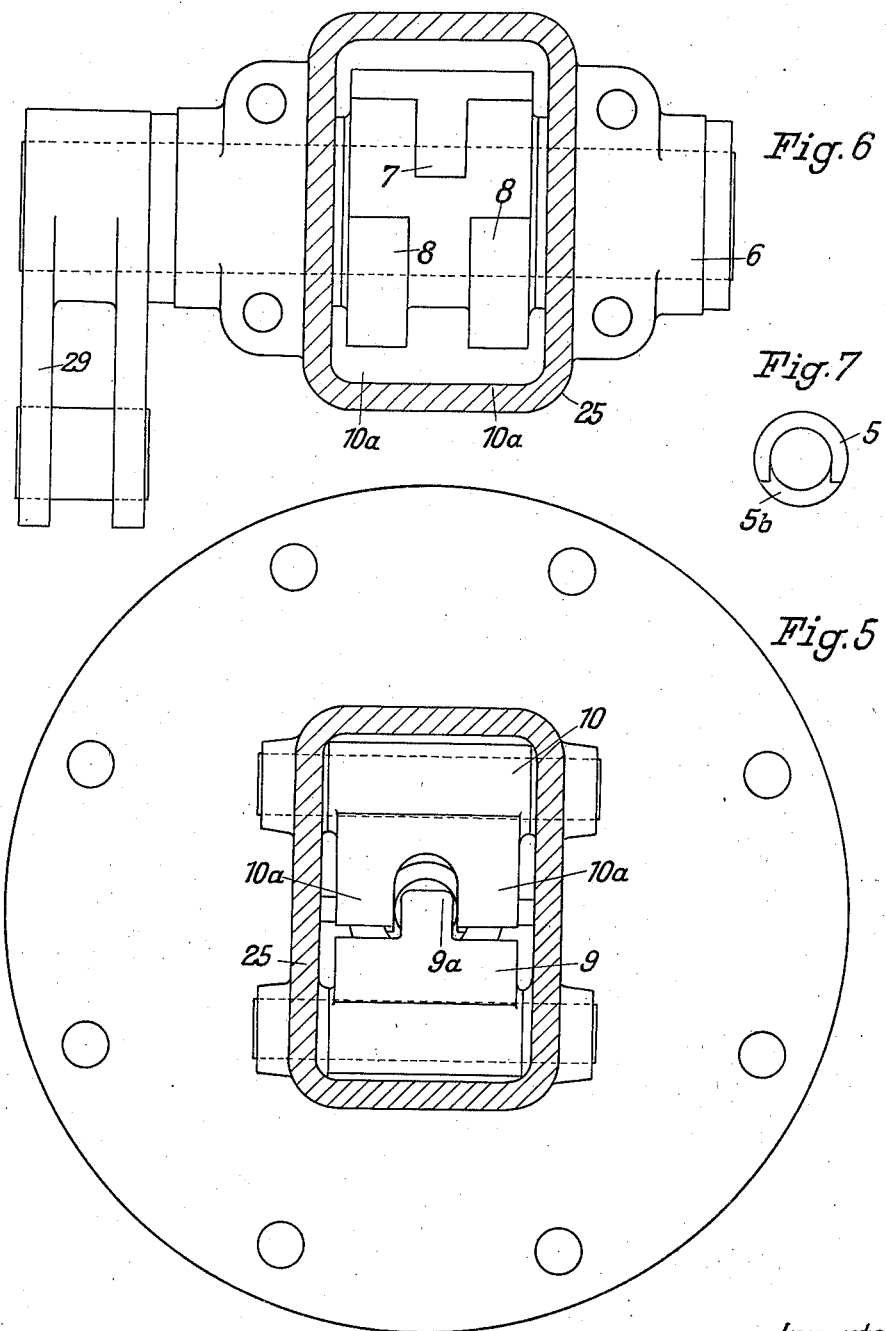

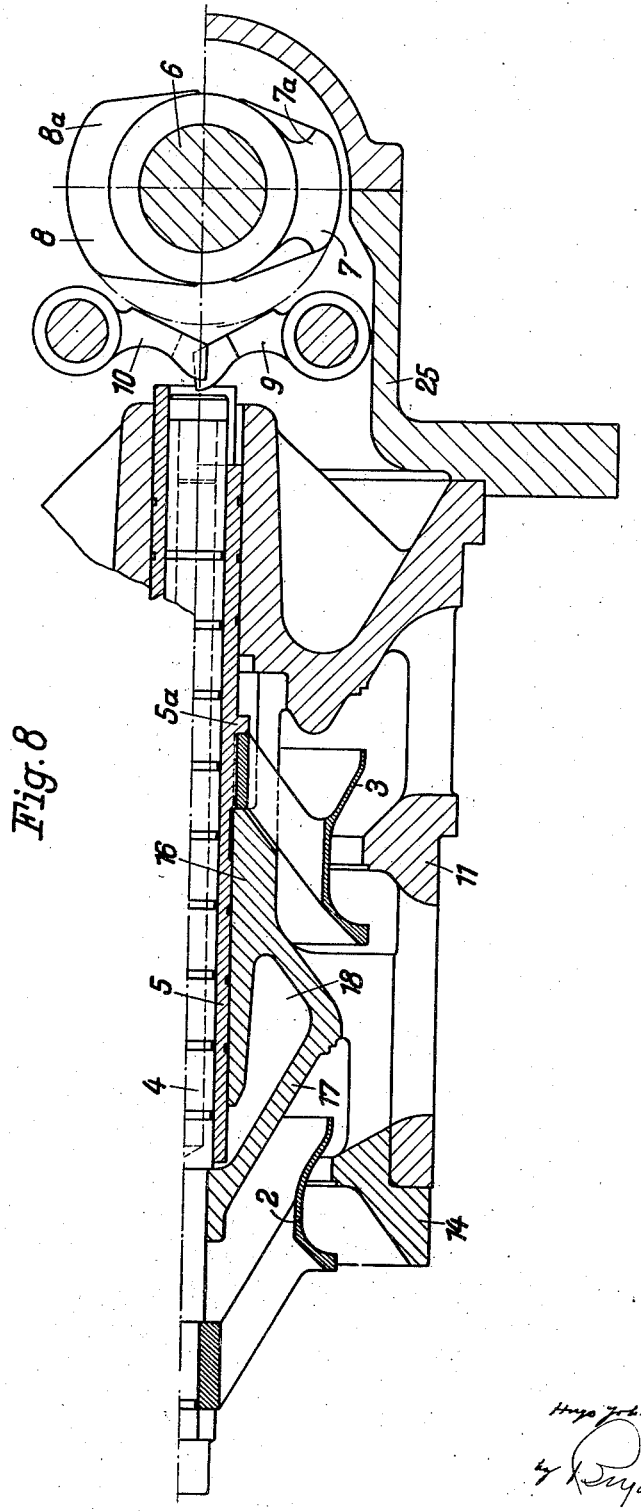

Nov. 8, 1938.  H. J. LENTZ  2,136,013
INSERT FOR CONVERTING PISTON VALVE ENGINES INTO POPPET VALVE ENGINES
Filed April 7, 1937   6 Sheets-Sheet 6
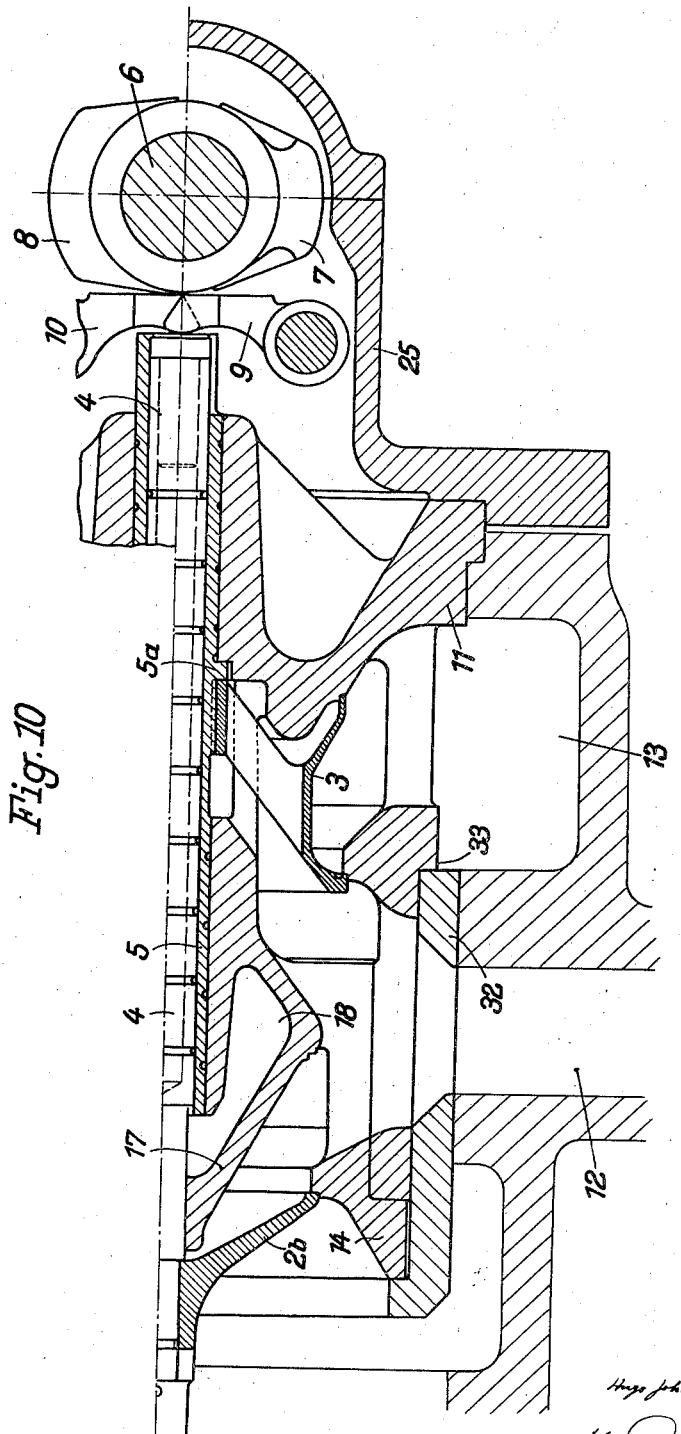
Inventor:
Hugo Johannes Lentz Patented Nov. 8, 1938

2,136,013

UNITED STATES PATENT OFFICE 2,136,013

INSERT FOR CONVERTING PISTON-VALVE ENGINES INTO POPPET-VALVE ENGINES

Hugo Johannes Lentz, Vienna, Austria

Application April 7, 1937, Serial No. 135,564
In Austria January 15, 1937

10 Claims. (Cl. 121—127)

It is already known to use, for the conversion of piston steam engines, particularly locomotive steam engines or marine steam engines with piston valve gear into engines with poppet valve gear, inserts, which consist each of an admission valve and of an exhaust valve with valve spindles mounted the one in the other, and with a gear drive acting upon these spindles, said inserts being inserted in both ends of the piston slide valve casing instead of the removed piston slide valve. To avoid closing-springs for the valves, these valves are moved into their closing position by steam pressure acting upon the spindles of the same.

The invention has for its object the special construction of such an insert, in order to obtain a compact arrangement of all gear elements and, in spite of this compact construction, to obtain wide valve passages and sufficiently long guides for the valve-spindles. In this manner, the inserts may be standardized, permitting of a uniform manufacturing and of use for different types of steam locomotives without the necessity of exchanging the cylinders. In a similar manner the invention may be utilized for the conversion of marine steam engines.

This is achieved according to the invention by providing the insert body for the admission valve in each insert with a central guide for the co-axially arranged spindles of the admission valve and of the exhaust valve of the insert, by extending this guide as far as the bottom of the pot-shaped insert body for the exhaust valve in which it is inserted with one of its ends, and by providing a hollow space surrounding the other end of the guide. Steam is admitted to the hollow space and acts on both valve spindles in the closing direction of their valves.

In order to prevent leakage of steam from the space between the inlet valve and the exhaust valve past the tubular exhaust valve spindle, when the inlet valve is open and the exhaust valve is closed, a third valve seat is formed in addition to the two seats for the admission and exhaust valves by providing a collar on the exhaust valve spindle which makes a tight fit on a seat in the insert body for the exhaust valve.

The invention further relates to the special construction of the insert.

Different forms of construction are illustrated, by way of example, in the accompanying drawings, in which—

Fig. 5 is a section on line V—V of Fig. 2, viewed in the direction of the arrow A, whereas Fig. 6 shows a similar section viewed in the direction of arrow B.

Fig. 7 is an end view of the exhaust valve spindle,

Fig. 8 is a longitudinal section corresponding to Fig. 2, the valves and the intermediate levers being in the coasting position.

Figs. 9 and 10 show two other possibilities of building-in the inserts with their cam gear drive in section.

Figure 1:
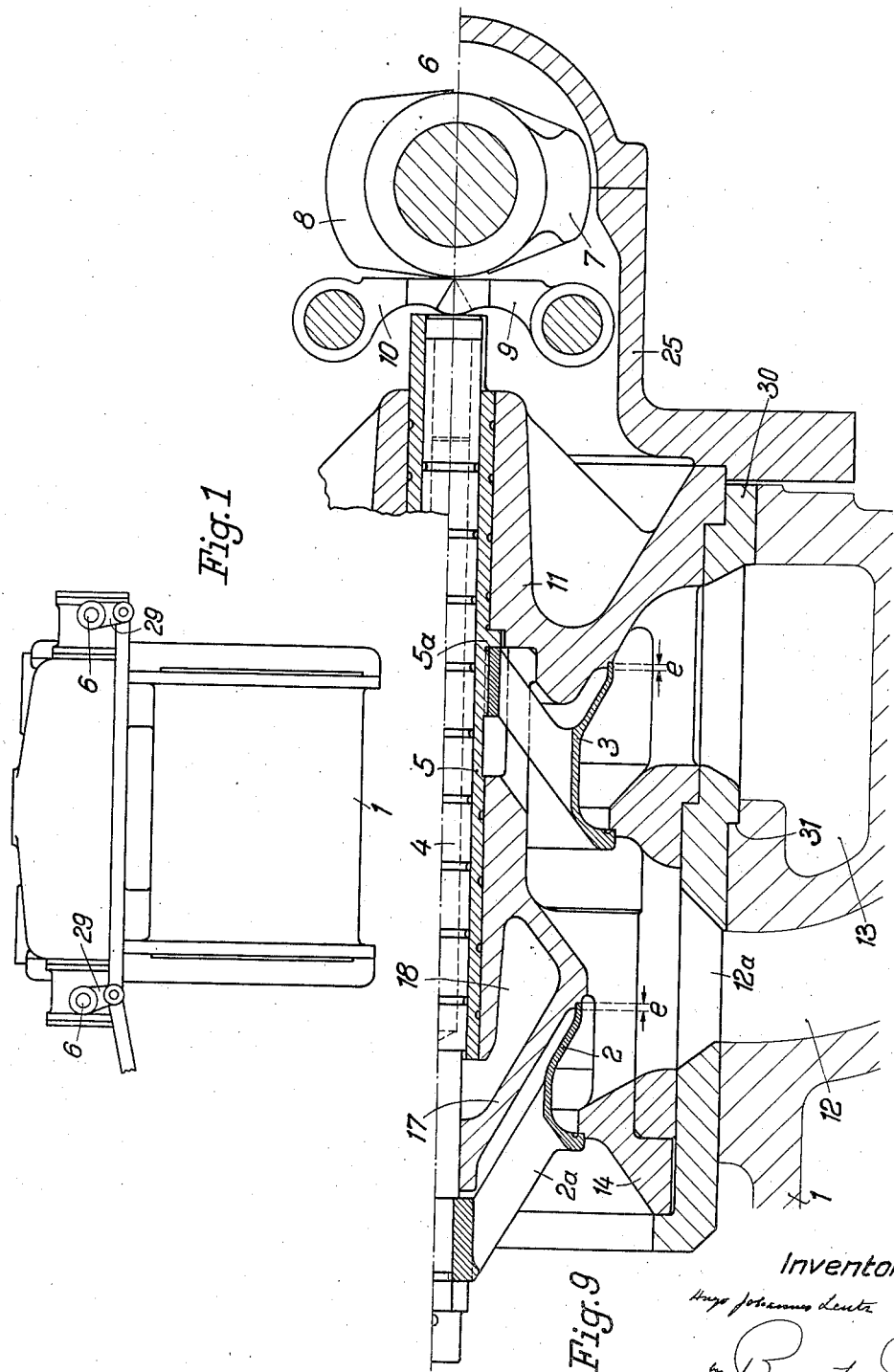
Fig. 1 shows a side elevation of the cylinder with built-in inserts and with the corresponding gear drive.

I designates the cylinder of the steam engine with a casing parallel to the cylinder axis, which casing, in the non-converted engine, accommodates the piston slide valve. After the piston slide valve has been removed and also its bush, an insert is inserted from each cylinder side into the cylindrical space which has become free, each insert consisting of two insert-bodies 11 and 14 with admission valve 2 and exhaust valve 3, said valves being actuated by a gear drive acting upon the solid admission valve spindle 4 and the tubular exhaust valve spindle 5 placed on the spindle 4 in co-axial relation. The gear drive consists, in the present instance, of an admission cam 7 keyed on a shaft 6 and of an exhaust cam 8 keyed on the same shaft. During the oscillating movement these cams roll on the lower faces of intermediate levers 9 and 10. The end 10a of the exhaust intermediate lever 10 is forkshaped and engages over the end of the admission intermediate lever 9, so that both ends can act upon the ends of the co-axial valve spindles.

The pot-shaped insert-body 11 for the exhaust valve 3 is constructed as a valve-cage which has, between the admission and the exhaust valve, a passage 12a communicating with the overflow channel 12, and behind each exhaust valve a passage 13a communicating with the exhaust channel 13. The insert-body 11 is directly inserted into the valve-casing and supported and packed in the same by ring-shaped extensions 11a.

In the insert-body 11 a second insert-body 14 is mounted, which is constructed as valve cage for the admission valve 2. It rests with its inner end on a ring-shaped projection 15 of the valve casing and is securely held in the casing by the insert-body 11.

The insert-body 14 has at the middle a long guide 16 reaching to the bottom of the insert body 11 and centered in the same by a ring-shaped projection 16a. The portion of the hollow exhaust valve spindle 5 situated on the inner side is mounted in the guide 16. The inner end of this guide is surrounded by a hollow body 17. The hollow space 18 in the hollow body is connected, by bores in the valve cage 14 and in the insert-body 11 and in a screw threaded bolt 20, screwed into the bore 19, with a steam pipe, not shown, through which saturated steam is supplied to the hollow space 18. The steam acts upon the end of the exhaust valve spindle and thereby presses the exhaust valve 3 on to its seat. To prevent the seat from turning, ribs 21 of the same engage in slots 22 of the guide 16.

Figure 2:
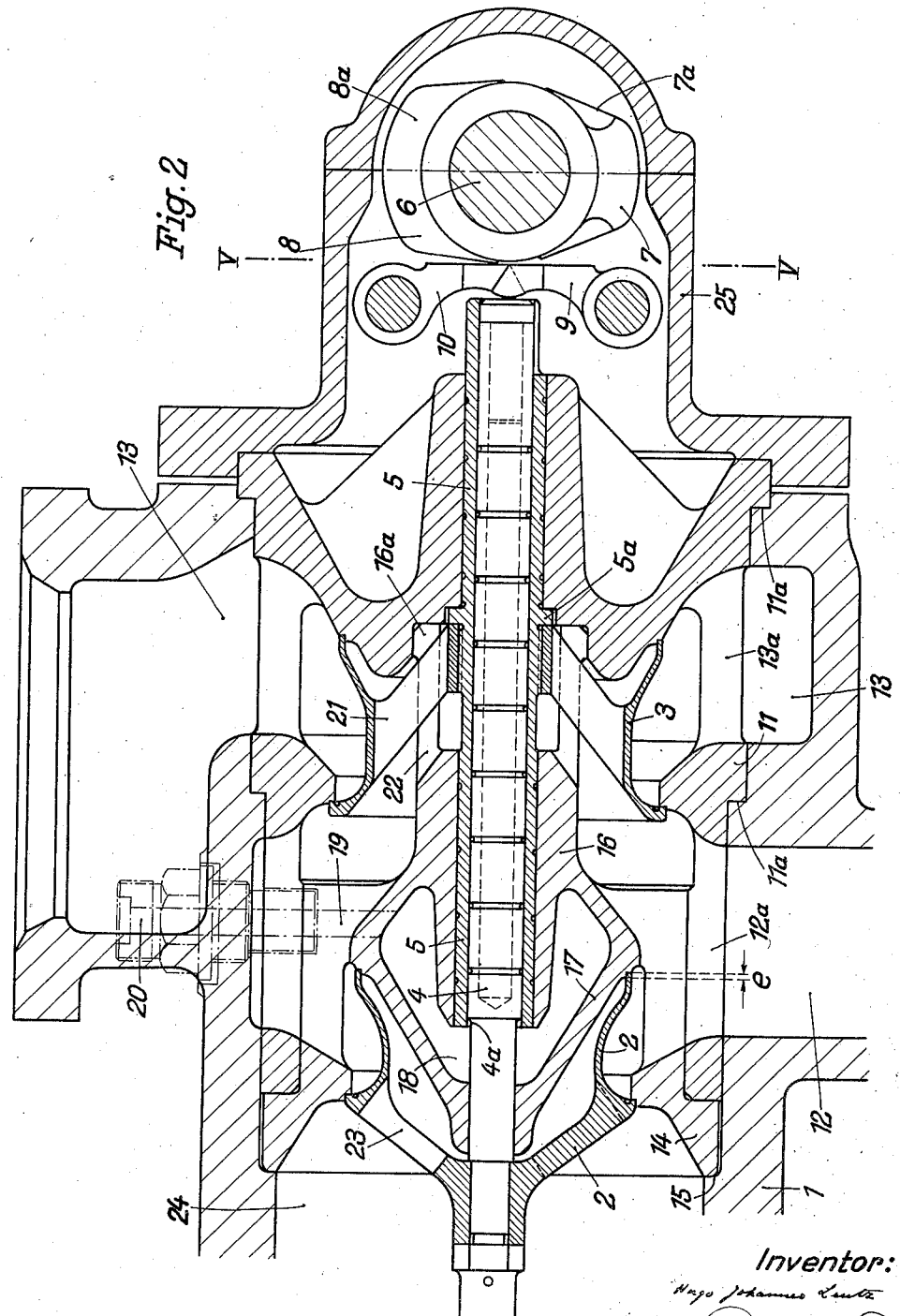
Fig. 2 is a longitudinal section through an insert and the adjacent portions of the cylinder casting.
Figure 3:
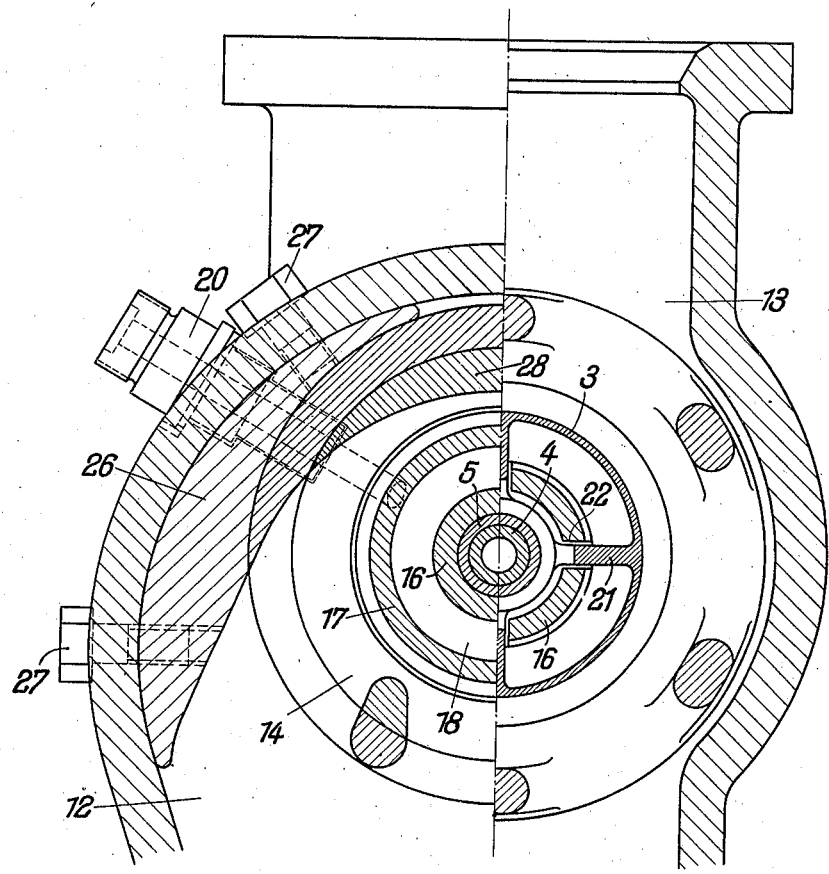
Fig. 3 shows in the left half a section on line III—III of Fig. 2, and in the right half a section on line IIIa—IIIa of Fig. 2.
Figure 4:
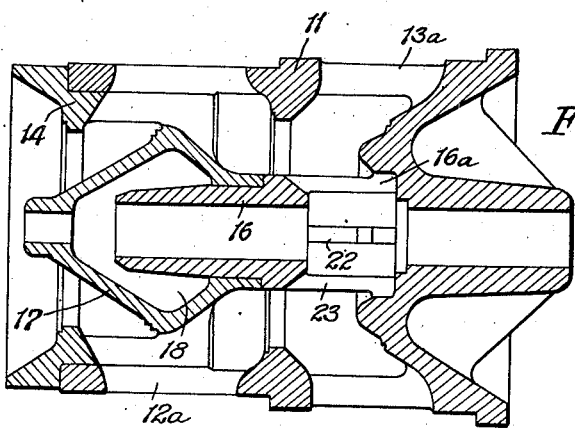
Fig. 4 shows in section a modified construction of the two insert-bodies.

If desired, the guide for the co-axial valve spindles 4 and 5, instead of being cast integral with the hollow body 17, as shown in Fig. 2, may be a separate member 16', inserted in the hollow body 17, as shown in Fig. 4, with the slots 22 and the projection 16a as described. This permits of making the guide from a resistant material.

The admission valve spindle 4 extends through the hollow spindle 5 of the exhaust valve. This spindle 4 is turned off within the hollow space 18 to a smaller diameter, so that the steam can act upon the exposed annular shoulder 4a. This shoulder is of such dimension that, the steam admission being shut off, the closing steam presses the admission valve upon its seat. During the service the steam pressure existing in the live steam space 24 acts to close the admission valve 2.

The hollow body 17 taking up the closing steam for the valves is preferably of conical shape this presenting two advantages: First it is possible to extend the spindle guides, so that no closing steam can flow over between the exhaust valve spindle 5 and the guide 16 into the space formed between the two valves. Further superheated steam flows around the hollow body 17, that is heats the same, so that the saturated steam can not condense, the small quantity of condensation water being present after a longer shut-down is eventually evaporated again.

To also pack relative to the gear casing the space between the two valves 2 and 3, the collar 5a of the exhaust valve spindle 5 which carries the exhaust valve 3 bears, when the exhaust valve is closed, against a seat of the insert body 11, and thus forms a valve-like closure situated in front of the spindle packing.

The admission valve also adapts itself to the hollow body 17. It may be constructed as pot-valve (Fig. 2), into the hollow space of which the hollow body 17 projects. Holes 23 in the bottom of the valve effect a relieving of the valve from the steam pressure, the steam from the live-steam space 24 flowing through the holes under the pot.

The admission valve 2, however, may also be constructed as shown in Fig. 9, as rib-valve, the ribs 2a of which are oblique and adapt themselves to the conical hollow body 17. The admission valve may further be constructed as a one-seat valve 2b (Fig. 10).

The insert-piece 11 with the admission valve cage 14 is securely held in the bore of the slide valve-casing by the gear casing 25 subdivided in two parts.

In order to reduce the clearances a sickle-shaped filling piece 26 of similar height as the admission channel is inserted into the piston slide valve casing opposite to the admission channel 12 in front of the insert body and securely held by screw bolts 27.

For the same reason the rib 28 of the insert-body 14 opposite the admission channel 12 is of sickle-shape.

For controlling the valves the intermediate levers 9 and 10 and the gear shaft 6 with the gear cams is mounted in the gear casing 25. A gear cam is fixed on the gear shaft and has lifting faces 7 for controlling the admission valve and lifting faces 8 for controlling the exhaust valve. The lifting faces 7 cooperate with the finger-shaped extension 9a of the intermediate lever 9 which acts directly upon the end of the admission valve spindle 4. The two lifting faces 8, however, act upon the fork-shaped ends 10a of the intermediate lever 10, which engage over the exhaust valve spindle from both sides. This spindle has at its end a slot 5b in which the finger 9a of the admission intermediate lever 9 can move. The gear shaft 6 is driven by a control rod connected with arm 29.

The lifting faces 7 and 8 are formed symmetrically to a diameter lying perpendicularly to the axes of the valve spindles, so that, when the lifting faces on the one side of the diameter are worn, the other lifting faces can be employed after the gear cam has been turned.

To keep the lifting faces during the idle running of the engine out of engagement with the intermediate levers 9 and 10, the latter are of such shape, that their centre of gravity is situated on the side of their pivot axes facing the valve spindles and remains in this position during the idle running of the engine, when the valves are maintained open owing to the shut off closing steam (see Fig. 8). They are brought into contact with the valve spindles only when the closing steam acts upon these valve spindles.

The insert bodies 11 and 14 carrying the valves and also the corresponding gear drive are of uniform construction for different types of locomotives, so that uniform manufacturing is possible.

In order that these uniform and standardized inserts may be employed also for engines, the slide valve casing of which are of larger diameter, a special insert bush 30 is used according to Fig. 9 which is inserted into the bore of the slide valve casing and secured and packed in the same by a ring shaped projection 31.

In the form of construction shown in Fig. 10 the front portion of the insert body 11 sits directly in the bore of the slide valve casing, whereas the inner reduced portion of the insert body 11 engages in a separate bush 32 inserted into the casing and bears against this bush with a ring-shaped projection 33. The bush 32 is pressed into the bore of the slide valve casing with slightly conical fit.

The locomotives to be converted are mostly fitted with Walschaert (Heusinger) gear. In order to decrease the forces occurring in the Heusinger gear and originating from the acceleration of the valve and spindle masses, an overlapping e is provided for the valves, so that the valves open only after having moved along the overlapping, so that, when opening, they possess already a certain lifting speed and the slow opening at the beginning of the lift does not come into effect. The lifting radii of the cams can thereby be made very great, and a soft lifting can be attained. The long spindle guide 16 or 16' results further in a very accurate and central guiding of the valves. This makes it possible, to reduce up to about 0.4 mm. the difference between the diameter of the upper valve seat and the diameter of the lower valve seat, so that the steam pressure loading the valve is reduced during the lifting of the same. These measures result in the least possible pressure upon the external gear.

I claim:

1. An insert for the conversion of piston valve steam engines into such engines with poppet valve gear, comprising in combination an admission valve and an exhaust valve, spindles of said valves mounted the one in the other, a gear drive acting upon said spindles, an insert body having a seat for said admission valve, a pot-shaped insert body having a seat for said exhaust valve, a central spindle guide on said valve insert body extending up to the bottom of said pot-shaped insert body, a hollow body surrounding the inlet-end portion of said guide, the interior of said hollow body being under steam pressure acting upon said valve spindles in the sense of closing said valves.

2. An insert, as specified in claim 1, comprising in combination with the insert body of the admission valve, the spindle guide, made as separate part of resistant material.

3. An insert as specified in claim 1, in which the hollow body is of conical shape.

4. An insert as specified in claim 1, in which the hollow body comprises a conical part and the admission valve has oblique ribs adapted to the shape of said conical part.

5. An insert as specified in claim 1, in which the admission valve is constructed as rotary body comprising a strongly conical perforated bottom and the hollow body with the guide project into the space enclosed by said valve.

6. An insert as specified in claim 1, comprising in combination with a cam shaft chamber and the exhaust valve, the exhaust valve spindle and a collar on said spindle, a seat on the exhaust insert body against which said collar bears when the exhaust valve is closed and effects a valve-like shutting-off of the spindle guide towards said cam shaft chamber.

7. An insert as specified in claim 1, comprising a bush adapted to take up said insert bodies.

8. An insert as specified in claim 1, comprising in combination with the exhaust insert body and the slide valve casing, a bush pressed into said slide valve casing with conical fit and surrounding the inner portion of said insert body.

9. An insert as specified in claim 1, comprising in combination with the valves, gear cams for controlling said valves and having on either side of a diameter lifting faces of similar shape, so that said gear cams can be turned round to serve as spare cams.

10. An insert as specified in claim 1, comprising in combination with the admission and exhaust valves, valve seats overlapping the controlling edges of said valves by a certain measure.

HUGO JOHANNES LENTZ.